(12) United States Patent
Carpenter et al.

(10) Patent No.: US 11,093,349 B2
(45) Date of Patent: Aug. 17, 2021

(54) SYSTEM AND METHOD FOR REACTIVE LOG SPOOLING

(71) Applicant: DELL PRODUCTS, LP, Round Rock, TX (US)

(72) Inventors: Dónal Carpenter, Wicklow (IE); Carlos Martins Rodrigues, Shankhill (IE)

(73) Assignee: Dell Products L.P., Round Rock, TX (US)

( * ) Notice: Subject to any disclaimer, the term of this patent is extended or adjusted under 35 U.S.C. 154(b) by 174 days.

(21) Appl. No.: 16/392,772

(22) Filed: Apr. 24, 2019

(65) Prior Publication Data

US 2020/0341868 A1 Oct. 29, 2020

(51) Int. Cl.
| | | |
|---|---|---|
| *G06F 11/00* | (2006.01) | |
| *G06F 11/14* | (2006.01) | |
| *G06F 11/34* | (2006.01) | |
| *G06F 40/205* | (2020.01) | |
| *G06F 11/07* | (2006.01) | |

(52) U.S. Cl.
CPC ...... *G06F 11/1471* (2013.01); *G06F 11/0709* (2013.01); *G06F 11/0787* (2013.01); *G06F 11/3476* (2013.01); *G06F 40/205* (2020.01)

(58) Field of Classification Search
CPC ............ G06F 11/0787; G06F 11/0778; G06F 11/0766; G06F 11/0709; G06F 11/3476; G06F 40/205
See application file for complete search history.

(56) References Cited

U.S. PATENT DOCUMENTS

| | | | |
|---|---|---|---|
| 7,493,598 B1* | 2/2009 | Craggs | G06F 11/3636 714/38.1 |
| 8,856,239 B1 | 10/2014 | Oliver et al. | |
| 8,904,243 B2* | 12/2014 | Loimuneva | G06F 11/0706 714/48 |
| 2008/0168242 A1* | 7/2008 | Eberbach | G06F 11/0778 711/161 |
| 2008/0168308 A1* | 7/2008 | Eberbach | G06F 11/008 714/26 |
| 2013/0227352 A1* | 8/2013 | Kumarasamy | G06F 11/1461 714/47.1 |
| 2015/0143182 A1* | 5/2015 | Rajamanickam | G06F 11/3072 714/48 |
| 2017/0168917 A1* | 6/2017 | Doi | G06F 11/3636 |
| 2017/0220664 A1 | 8/2017 | Rulev et al. | |
| 2018/0322564 A1 | 11/2018 | Dheekonda et al. | |
| 2019/0303231 A1* | 10/2019 | Togawa | G06F 11/0787 |
| 2019/0324649 A1* | 10/2019 | Rodgers | G06F 11/3072 |

* cited by examiner

Primary Examiner — Marc Duncan
(74) Attorney, Agent, or Firm — Larson Newman, LLP (57) ABSTRACT

An information handling system stores logs in a volatile log buffer for a pre-determined time, and monitors the logs in the log buffer in real-time. The system parses the logs to detect a triggering event, wherein the triggering event is one of an error event, a fatal event, or a critical event. In response to detecting the triggering event, the system stores debug level logs in a non-volatile storage device. If the predetermined time is reached, then the system determines whether to discard the logs or to store the logs in the non-volatile storage device. In response to a determination to discard the logs, the logs in the log buffer may be discarded.

17 Claims, 5 Drawing Sheets

SYSTEM AND METHOD FOR REACTIVE LOG SPOOLING

FIELD OF THE DISCLOSURE

The present disclosure generally relates to information handling systems and more particularly relates to reactive log spooling.

BACKGROUND

As the value and use of information continue to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may store logs in a volatile log buffer for a pre-determined time, and monitor the logs in real-time. The system parses the logs to detect a triggering event, wherein the triggering event is one of an error event, a fatal event, or a critical event. In response to detecting the triggering event, the system stores debug level logs in a non-volatile storage device. If the predetermined time is reached, then the system determines whether to discard the logs or to store the logs in the non-volatile storage device. In response to a determination to discard the logs, the logs may be discarded.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
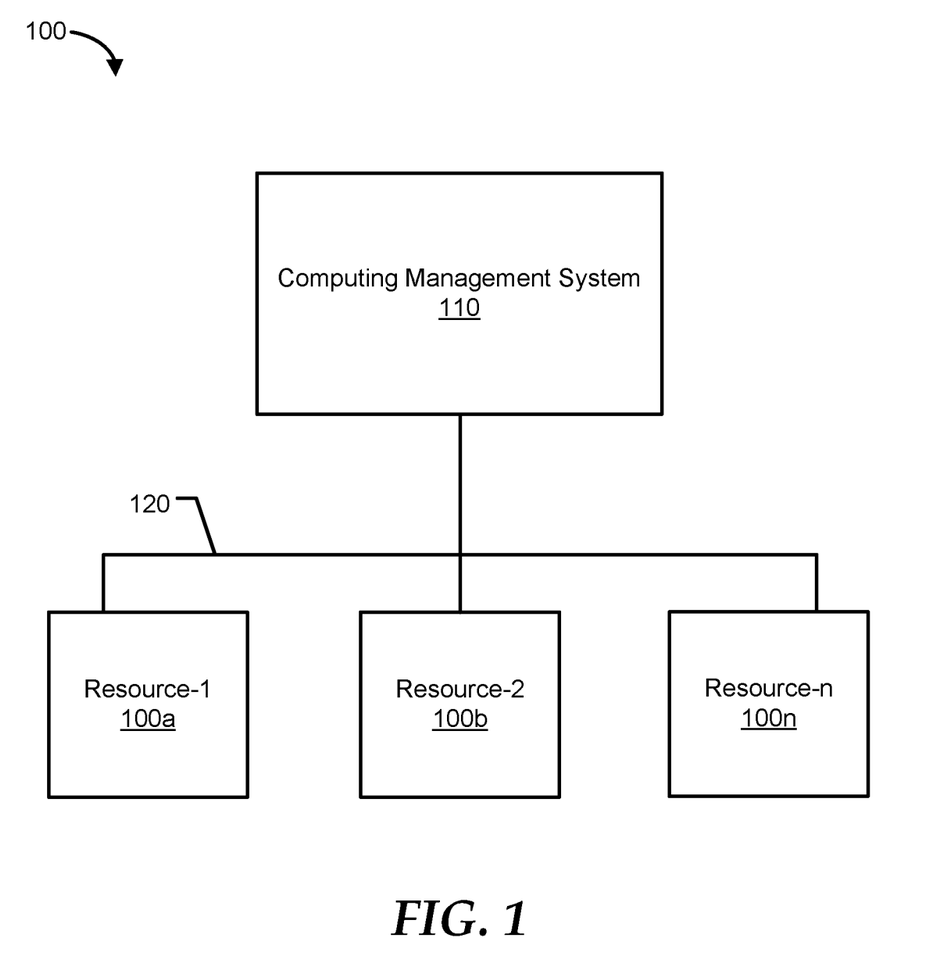
FIG. 1 is a block diagram of a computer system, according to at least one embodiment of the present disclosure.

FIG. 1 shows a computer system 100 for implementing reactive log spooling. Log messages are data generated by systems, components of systems, applications, devices, etc. that can be used to monitor its activities and to diagnose and/or troubleshoot issues. These log messages also referred to as logs are usually collected and stored in a defined non-volatile persistent layer such as files, databases, etc. The log messages may be spooled temporarily or written to a pool of volatile storage such as a buffer or cache prior to storage in a non-volatile storage device such as a hard disk. Computer system 100 determines in real-time whether to store permanently, such as in a non-volatile storage device, the log messages or a subset thereof which had occurred in the past and temporarily stored in the volatile storage. For example, computer system 100 may determine whether to store to a non-volatile storage device, previously observed log messages based on a current occurrence of an event to log messages that are currently being observed or monitored. Previously observed log messages as used herein may refer to the log messages that are currently in the volatile storage device or log buffer. In another example, computer system 100 may determine whether to discard or store the previously observed log messages when a predetermined time is reached and no event such as an error or warning has been observed. In response to a determination to discard the log messages, the log messages will not be stored or persisted in the non-volatile storage device.

The log messages can be classified into different categories, such as informational log messages, debug log messages, warning log messages, error log messages, and alert log messages. The informational log messages are data generated during normal operation. For example, an informational log message may be generated when a user logs into a system. The debug log messages are generally generated to aid in troubleshooting and identifying problems. The warning log messages are generally generated to indicate a possible occurrence of a future problem, such as when memory space is running low. The error log messages are generated when errors or exceptions occur. For example, an error log message is generated when a hard disk fails. The alert log messages are generally related to security-related events, such as when an unauthorized user tries to log in a system.

As a number of applications are deployed over hundreds or thousands of virtual machines, for example, the volume of log messages generated can be extremely large and contain irrelevant or useless information. It can be difficult to manage and utilize the log messages. In addition, as the size of the log messages increases so does the time, amount of bandwidth, computational resources and storage space needed for the log messages. For example, log messages may contain noise or irrelevant data that may slow down a developer in tracking a production issue causing a company earnings due to prolonged production downtime. Described herein are systems and techniques for the collection and storage of relevant information so as to reduce noise, optimize the bandwidth, computational resources and/or storage space needed. The reactive approach of log spooling monitors log messages being stored in the log buffer and determines which log messages or portion thereof are collected and stored at runtime.

The computer system 100 includes a computing management system 110 connected to information handling systems also referred to as resources 100a-100n through a communication medium 120. Other embodiments of computing management system 110 are possible and are intended to fall within the scope of the disclosure. Computing management system 110 of FIG. 1 may contain one or more interconnected computing management systems which may be manufactured by one or more different vendors. Each of the interconnected computing management systems may be included in an embodiment of the computer system 100 of FIG. 1 to provide data logging services to, for example, resources 100a-100n which may be in the same or different geographical locations. Also, each one of resources 100a-100n may perform different types of data operations in accordance with different tasks and applications executing on resources 100a-100n.

In this embodiment of computer system 100, computing management system 110 may manage and/or monitor resources 100a-100n for various purposes such as performance tuning and troubleshooting. For example, computing management system 110 may monitor resources 100a-100n in order to detect changes in the operational status of each of resources 100a-100n. The changes in the operational status may be determined through the log messages generated by each of resources 100a-100n and then collected by computing management system 110 for analysis. In another embodiment, computing management system 110 may be included in computer system 100.

The communication medium 120 may use any one or more of a variety of networks or another type of communication connection as known to those skilled in the art. The type of communication connection used may vary with certain system parameters and requirements, such as those related to bandwidth and throughput required in accordance with a rate of log messages as may be generated by resources 100a-100n. The communication connection may be a network connection, bus, and/or another type of data links, such as a hardwire or other connections known in the art. For example, communication medium 120 may use the internet, an intranet, a network or other wireless or other hardwired connection(s) by which resources 100a-100n may access and communicate with computing management system 110.

Communication medium 120 may use a variety of different communication protocols such as small computer system interface (SCSI), enterprise systems connection (ESCON), Fibre Channel, internet small computer system interface (iSCSI), or Gigabit Ethernet (GigE), and the like. Some or all of the connections by which resources 100a-100n and computing management system 110 may be connected to communication medium 120 may pass through other communication devices, such as switching equipment, a phone line, a repeater, a multiplexer or even a satellite.

Figure 2:
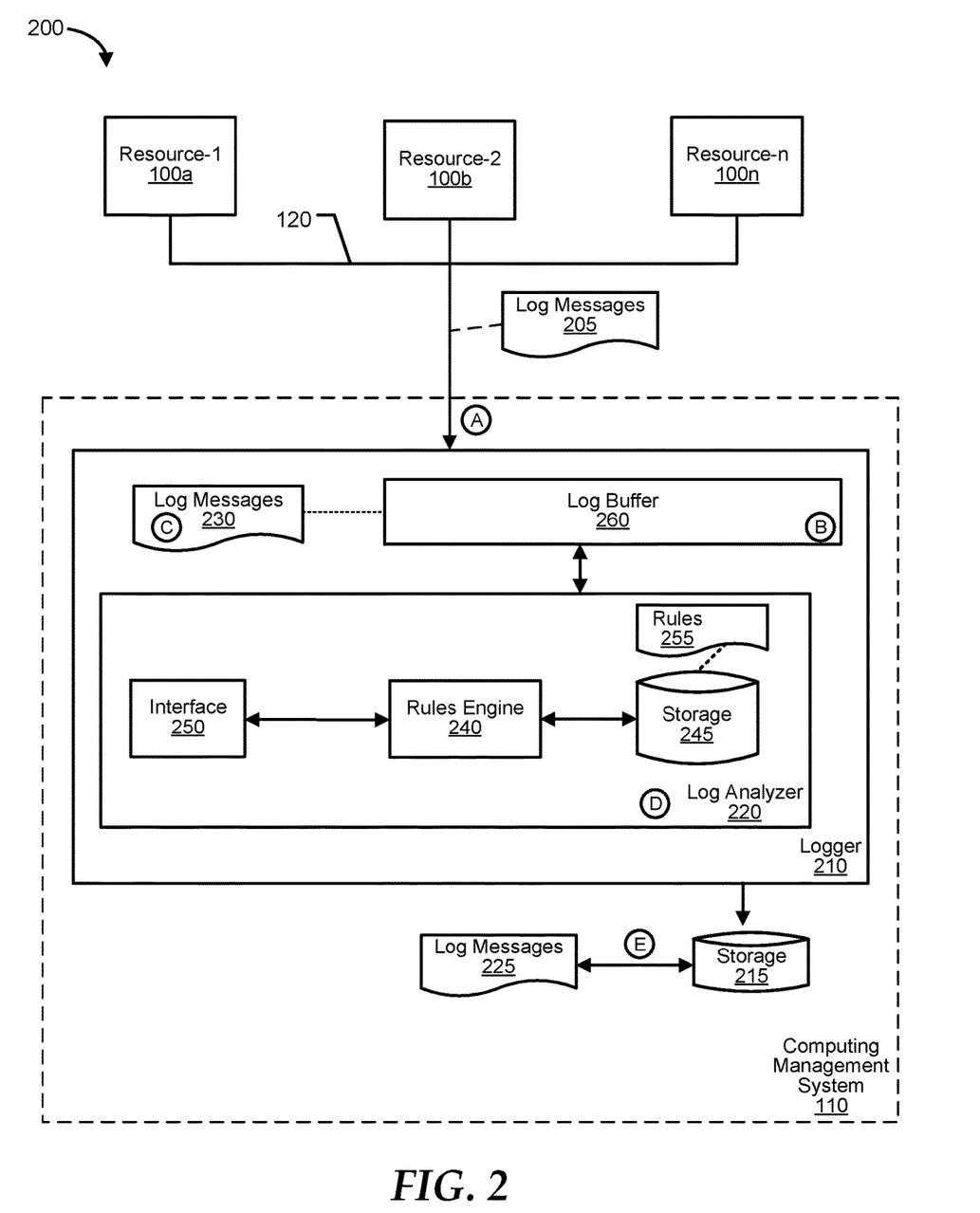
FIG. 2 is a more detailed block diagram of the computer system, according to at least one embodiment of the present disclosure.

FIG. 2 shows computer system 100 in greater detail. Computing management system 110 includes a logger 210 and a storage 215. Logger 210 includes log analyzer 220 and a log buffer 260. Log analyzer 220 includes an interface 250, a rules engine 240, and a storage 245 which contains rules 255. Each of these components can be implemented with hardware and/or software, including virtual machines. Computing management system 110 may be implemented as a single management server or a plurality of virtual or physical servers which may or may not be geographically co-located. For example, computing management system 110 and/or other aspects of computer system 100 may be hosted in a cloud-based hosting service.

Each of resources 100a-100n may be a server device such as enterprise server, application server, email server, web server, content server, application server, etc. Alternatively, resources 100-100n may be a client device such as a desktop computer, a tablet, a smartphone, etc. In some arrangements, resources 100a-100n may include both server devices and client devices. Resources 100a-100n may also include Internet-of-things (IoT) devices such as household IoT devices, commercial IoT devices, industrial IoT devices, medical IoT devices, etc. Household IoT devices include network connected home lighting devices, thermostats, smoke detectors, alarm systems and the like. Commercial IoT devices include network connected cash registers, vending machines, utility meters, and the like. Industrial IoT devices include gas monitors, process equipment controls, and the like. Medical IoT devices include monitors, patient communication devices, and the like. Each of resources 100a-100n may include a network interface with a capability of sending and receiving information via communication medium 120. Each of these resources may include software and/or hardware modules configured to transmit and/or receive log messages.

Logger 210 monitors or analyzes log messages such as log messages 205 in real-time based on various rules. During the monitoring process or analysis, logger 210 may detect and respond to certain triggering events as defined by established policies or rules. The response to the detected triggering event can include flushing the log messages that were previously recorded in log buffer 260 such as log messages 230, resetting a timer of log buffer 260 to a predetermined level, or discarding log messages in log buffer 260. Logger 210 may be associated with a particular application and/or resource. Discarding log messages in log buffer 260 may include deleting the log messages, overwriting the log messages and/or marking the log messages for deletion/overwriting. Flushing the log messages in the log buffer 260 may include offloading log messages from the log buffer 260 and storing the offloaded log messages or the portion thereof to the non-volatile storage device. The log messages stored in the non-volatile storage device may include all the log messages regardless of log level. For example, informational, trace, debug, warning, etc. logs may be stored in the non-volatile storage device. In another example, only error and/or warning log messages may be stored in the non-volatile storage device. Subsequent to storing the log messages in the non-volatile storage device, the log messages in the log buffer may be overwritten with new log messages.

Figure 3:
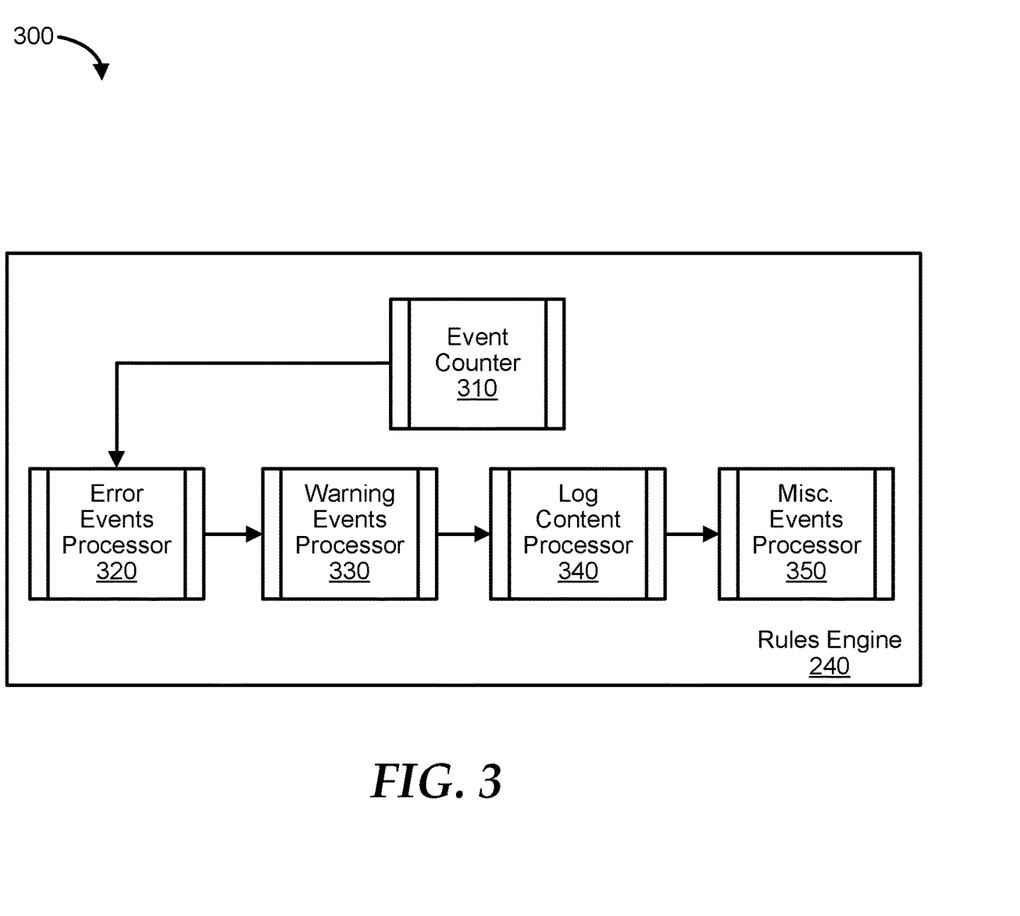
FIG. 3 is a block diagram of a rule flow associated with a path that rules engine may take in processing log messages, according to an embodiment of the present disclosure.

Rules engine 240 establishes policies or rules that determine, based on a contextual variable, a rule flow similar to rule flow 300. Rules engine 240 executes the rule flow against the log messages or a portion thereof, in the log buffer. Based on the execution of the rule flow, the rules engine determines whether the log messages may be stored in a non-volatile storage device. In other words, the rule may be run to monitor for an event such as an error that may trigger storage of log messages currently in the log buffer to be stored in the non-volatile storage device. As an option, a user may specify to run a different rule flow such as to run all the rules against some or all of the log messages. A rule may also be run against a particular application and/or resource.

Rules engine 240 can be established by users, corporate administrators, or other parties. A rule may be defined as a Boolean expression that evaluates to true or false. The Boolean expression for each rule typically specifies absolute values and/or ranges of values for each of one or more contextual variables. The values and/or ranges of values can be connected by Boolean operators such as, AND, OR, and NOT.

Interface 250 allows users to provide configuration changes such to add, modify, or delete rules in storage 245 at runtime. Because rules are generally stored in a configuration file or environment variable, interface 250 may be used to make changes to the configuration file and/or environment variable. Interface 250 can be triggered by and work in conjunction with other components of computing management system 110 such as logger 210. Interface 250 can conform to certain architectural styles, formats and/or protocols such as representational state transfer (REST) architectural style.

Storages 215 and 245 may be persistent data storage devices. Storages 215 and 245 may include solid state disks, hard disk drives, magnetic tape libraries, optical disk drives, magneto-optical disk drives, compact disk drives, compact disk arrays, disk array controllers, and/or any computer-readable medium operable to store data. Storage 215 may include a database or a collection of log files that is a central repository of log messages. Storage 245 may include a database or a collection of files that is a central repository of rules that rules engine 240 may retrieve, store, and utilize.

FIG. 2 is annotated with a series of letters A-E. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, resources 100a-100n generate log messages 205 of certain events and transmits the generated log messages to computing management system 110. Log messages 205 may also be referred to as logs. Events can be detected occurrences or actions that may or may not deviate from what is expected, merit special handling, and/or warrant tracking. An event may vary depending on the application being monitored. The event may result from sub-event occurrences or conditions such as slow response, an incorrect internet protocol (IP) address, or a system failure. As another example, a particular metric reaching or exceeding a threshold may be classified as an event. Events can include errors, exceptions, completed transactions, triggers, combinations of same and/or the like. During the transmission, log messages 205 may be monitored in real-time to detect whether a particular event occurred. The computing management system 110 may monitor log messages 205 via a watcher. The watcher may be an application in the computing management system 110. The watcher may parse incoming log messages such as log messages 205 in real time. The watcher may also parse the incoming log messages prior to storing in log buffer 260. For example, computing management system 110 may monitor the incoming log messages to detect an error event, a certain number of warning events, etc. In another embodiment, the watcher may be an application in the resources 100a-100n.

At stage B, log messages 230 are stored in log buffer 260 by logger 210. Log buffer 260 may be a temporary storage location for log messages. Log messages 230 are previously observed log messages that have been stored in log buffer 260 prior to the transmission of log messages 205. Log messages 230 may be stored in log buffer 260 for a predetermined time period. Log messages that have not been stored for the predetermined time period may be blocked for a permanent storage in the non-volatile storage device until the predetermined time period is reached.

At stage C, computing management system 110 may filter log messages 230 in log buffer 260 and may determine to set or activate a trigger to invoke logger 210 to discard or flush log messages 230 based on the monitoring of log messages 205 in stage A. Logger 210 may determine whether to discard log messages 230 or to flush log messages 230 to storage 215 based on certain criteria and/or triggering event. Logger 210 may filter log messages 230 based on current events detected during the real-time monitoring of log messages 205. For example, logger 210 may detect a fatal error while monitoring log messages 205 in real time and determine to flush log messages 230 based on the detected fatal error. Computing management system 110 may set a trigger when a certain time has passed since the last time log messages in the log buffer 260 were discarded or flushed. The trigger may also be set when the size of log messages 230 has reached or exceeded a certain threshold. Upon detection of the trigger, logger 210 determines whether to persist or discard log messages 230. For example, if only a subset of the log messages 230 has exceeded a time threshold, then only the subset of the log messages 230 may be stored in the non-volatile storage device and not the entire log messages 230.

At stage D, rules engine 240 determines and applies all or some of rules 255 against log messages 230 in order to determine whether to discard or store log messages 230 in storage 215. Rules 255 could identify the level of log messages 230. Rules 255 could determine which log message levels to store. For example, rules 255 could be used to identify which log messages are informational or trace level messages. Rules 255 could further determine to store previously observed trace level messages when an error event is triggered. The stored log messages can then be used to diagnose the error event. In another example, rules engine 240 could identify log messages related to a same transaction or request, log entries related to a particular type of event such as permissions issues, connectivity issues, etc. or combinations of the same and/or the like. Rules engine 240 may identify the same transaction or request via a correlation id or thread id.

At stage E, if rules engine 240 determines that log messages 230 are to be stored based on real-time events, then log messages 230 are stored in storage 215. Log messages 225 represents log 230 after it has been stored in storage 215. Log messages 225 may be formatted prior to storage. The log messages may be stored in files or in one or more tables in a database. By analyzing real-time log messages such as log messages 205 and filtering buffered log messages such as log messages 230 prior to storage, computing management system 110 decreases the number of resources such as the size of disk space needed to store the log messages. In addition, because applications can generate massive amounts of log messages much of which are noise, investigating log messages to discover a root cause of the detected event error may be tedious. By limiting the number of log messages to be stored, for example only storing the log messages buffered for a predetermined time before the detected error or notification event, investigating log messages would be more efficient because of the noise reduction. Because of the more efficient investigation, production issues may be resolved faster. The filter can be based on certain features such as types of events, events produced by a particular source, response times, a source identifier (ID), etc. Log messages 225 may include one or more portions of log messages 230. After storage of the log message 225 in storage 215, log messages 230 in log buffer 260 may be discarded or overwritten.

FIG. 3 illustrates a rule flow 300 associated with a path that rules engine 240 takes in processing log messages 205 of FIG. 3. Rule flow 300 includes an event counter 310, an error events processor 320, a warning events processor 330, a log content processor 340, and a miscellaneous events processor 350. In this embodiment, rule flow 300 may represent a section of the master rule flow. Rule flow 300 may be associated with a particular application, a particular resource, a set of log messages, etc.

As shown in FIG. 3, event counter 310 is the first rule group in rule flow 300. Event counter 310 may include rules for detecting different events in log messages 205. An event is an occurrence or an action that is detected by a program. The event can be performed by a user action or generated by a system occurrence. Generally, information regarding the event is included in the log messages. The information may include type, severity, cause, value, timestamp, source, debug/trace output, etc. for the event. Event counter 310 may include an event counter respective for each type or category of the event. For example, event counter 310 may have a different event counter for error events, warning events, critical event, informational events, etc. In addition, the event counters may further be associated with an application, resource, device, etc. For example, there may be a different error event counter for each one of resources 100a-100n. Further, there may be an event counter per log level. For example, each the event counter may indicate a number of a particular event per log level.

Generally, log levels control the category and granularity of detail of the information that is logged. Logging levels include the following: debug level, trace level, error level, and informational level. The debug level includes debug log messages. Trace level is more verbose than debug level and generally includes finer-grained data to provide more insight than the debug level. The trace level log messages are usually deemed too noisy for production environments but may be needed in test environments. Informational level includes informational log messages while error level includes error log messages. The number of log messages varies between each level. Generally, there are more messages logged at the trace level than the debug level, for example.

Error events processor 320 may include a set of rules for detecting and/or handling error events. The error events may be categorized into non-critical, critical and/or fatal error events. Each category of error events may trigger an additional rule(s) and/or rule group(s) and thereby a set of actions. For example, if a critical error is detected in one of the log messages, the following actions may occur: First, a trigger may be set to determine whether to discard or flush the log messages in the log buffer. As used herein, to discard log messages means to not store the log messages in the non-volatile storage device. The log messages to be discarded may be overwritten, deleted or removed from the buffer. Also, as used herein, to flush log messages means to store the log messages in the non-volatile storage device. Second, in response to determining to flush the log messages, all of the log messages in the buffer are stored in a non-volatile storage device.

Warning events processor 330 may include a set of rules for detecting and/or handling warning events. Warning events may trigger an additional rule(s) and/or rule group(s) and thereby a set of actions. For example, if a number of warning events reach or exceeds a threshold within a particular time frame, the following actions may occur: First, a trigger may be set to flush all of the log messages in the log buffer. Second, in response to the trigger, all of the log messages in the log buffer to the non-volatile storage device. Prior to storing the log messages in the non-volatile storage device, a set of rules may be run against the log messages. For example, the rules may identify and store the trace level log messages. The log messages in the log buffer may then be overwritten. Finally, a timer may be reset.

Log content processor 340 may include a set of rules for parsing the log messages. The log messages may be parsed using a log parser grammar. The log parser grammar may have been designed or dynamically generated that is based on the type of application, resource and/or event. The log messages may also be parsed using regular expressions. The rules engine 240 may select other rules and/or rule groups based on the information derived during parsing the log messages. For example, additional rule(s) and/or rule group(s) thereby a set of actions may be triggered if a timestamp from a particular resource reaches or exceeds a threshold. For example, the following actions may occur: For example, if a response timestamp of a resource reaches or exceeds a threshold such as five minutes after a particular time frame, the following actions may occur: First, a flag may be set to identify that a particular trigger has been set. Second, after the trigger has been detected, rules may be used to determine whether to discard or store the log messages. For example, the trigger may be set to store the log messages from a particular time frame such as the current time to five minutes in the past. Third, in response to the detected trigger, the log messages are stored in a non-volatile storage device. The log messages in the log buffer may be overwritten or discarded. Finally, the timer may be reset to zero.

One of the rules in miscellaneous events processor 350 may be discarding the log messages in log buffer if a non-critical error event is detected within a time frame after the last time the log messages were discarded or stored in the non-volatile storage device. In another example, if a certain number of non-critical error events combined with another certain number of warning events in a particular time period, the flag may be set to flush the log messages in the log buffer otherwise the log messages may be discarded. Miscellaneous events processor 350 may also include rules to monitor the health and/or usage of resources, devices, applications, systems, and/or components of the systems. Also, because the log buffer is flushed based on the rules, relevant logging information may be dynamically stored in the non-volatile storage device at runtime which minimizes the risk of losing data compared to traditional buffered logging mechanisms.

Figure 4:
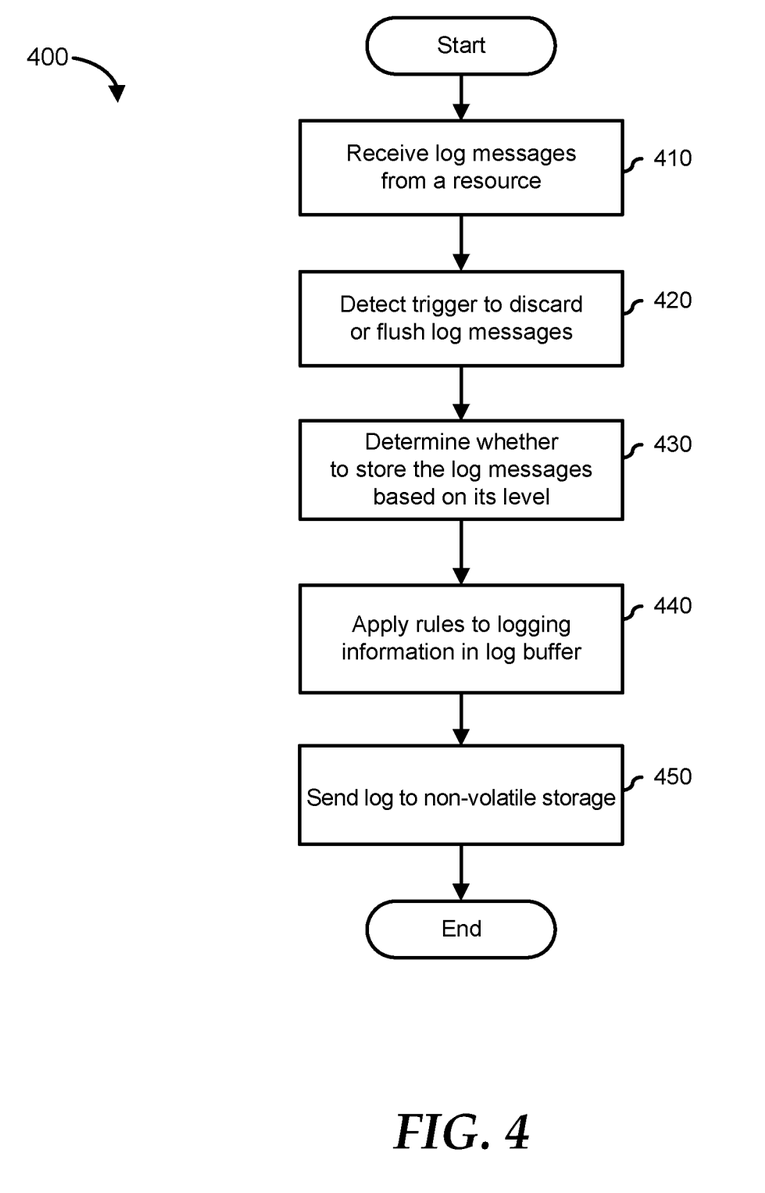
FIG. 4 is a flowchart illustrating a method for reactive log spooling by a computing management system, according to an embodiment of the present disclosure.

FIG. 4 shows a method 400 for reactive log spooling by a computing management system. The method 400 may be performed by the computing management system described in FIG. 1. At block 410, the computing management system receives log messages from various resources. The logger receives the log messages and temporarily stores the log messages in a log buffer. The logger buffer may store the log message for a pre-determined time. A timer may be used to reset recorded log level or log message level to stored in the non-volatile storage device. The log messages can include critical data required for determining health, performance, operation, diagnosing and/or troubleshooting of a resource. In another embodiment, the computing management system may monitor and collect the log messages generated by the various resources.

At block 420, the logger detects a trigger and determines whether to discard the log messages or flush the log buffer. The trigger may be generated automatically by the computing management system in response to an occurrence, regular intervals, or manually by a user. The trigger may be set by reaching or exceeding a certain threshold such as reaching or exceeding a certain size of the log buffer, reaching or exceeding a certain number of log messages in the log buffer, reaching or exceeding a certain time period or threshold. The trigger may also be set by the computing management system when parsing the log messages to determine whether a rule is applicable to the log messages. The computing management system may set a trigger, such as to flush the log buffer or to discard the log messages in the log buffer, when it determines that the rule is applicable.

The log buffer may be inactive when no log messages are received or collected for example. The trigger may also be set by the rules engine. For example, the rules engine may set the trigger based on identifying a security event in the log messages. Severity events can include the following: an emergency event, an alert event, a critical event, etc. Emergency events relate to events that may render a resource unusable. Alert events may relate to events wherein an immediate action is needed. Critical events relate to resources in critical condition.

At block 430, prior to storage of log messages to the non-volatile storage device, the rules engine determines whether to store the log messages based on its level such as trace, debug, informational, etc. At block 440, the rules engine applies the determined rules to the log messages. The rules may execute code to perform different operations on log messages prior to storage of the log messages or a portion thereof. The operations may be performed by the rules engine applying a set of one or more rules to the log messages. The rules may be customized using configurable criteria and used to filter out irrelevant data and/or request for additional information from various resources. Each one of the rules may define a condition and an action. For example, the actions may include collecting trace level information or directing the resource to execute one or more diagnostic routines to generate diagnostic log messages. The rules may also be used to parse the log messages.

At block 450, the log messages are stored in the non-volatile storage device. The log messages may be distributed among one or more files and/or databases. The databases may be implemented in one or more data structures, log files, tables, linked lists. In another embodiment, a portion of the log messages is stored in the non-volatile storage device. In yet another embodiment, the log messages or the portion thereof may be stored in more than one non-volatile storage device.

Statistical data may be generated periodically such every time after the log buffer is flushed, the log messages discarded or after a certain time period has elapsed. The statistical data may be generated from the log messages or other information such as timestamp from an operating system of the computing management system, etc. For instance, a counter may be used to keep track of the number of times the log buffer is flushed or the log messages discarded. Another counter may be used to keep track of the size of the log messages that are discarded or stored in the non-volatile storage device. The generated statistical data may be used to improve a logging threshold. The logging threshold may refer to a level of the log messages to be stored in the non-volatile storage device. Determining the level of the log messages to be stored in the non-volatile storage device may be performed every time the log buffer is flushed. In another embodiment, the level of the log messages to be stored in the non-volatile storage device may be reset to a pre-determined level every time the log buffer is flushed.

The statistical data may be used to determine a health status of an application, a resource, a device, etc. The health status of the application, the resource, or the device may be determined periodically. For example, the health status may be determined hourly, daily, weekly, monthly, etc. The health status of the application, the resource, or the device may be determined based on a frequency of the log buffer flush. For example, if the log buffer is flushed more frequently than a current average, then there is a probability that the health status of the application, the resource or the device is declining. In another example, if the log buffer is flushed less frequently than the current average, then there is a probability that the health status of the application, the resource or the device is good. A pre-determined threshold regarding the frequency of log buffer flushes may be identified to indicate the health of the application, the resource or the device.

Figure 5:
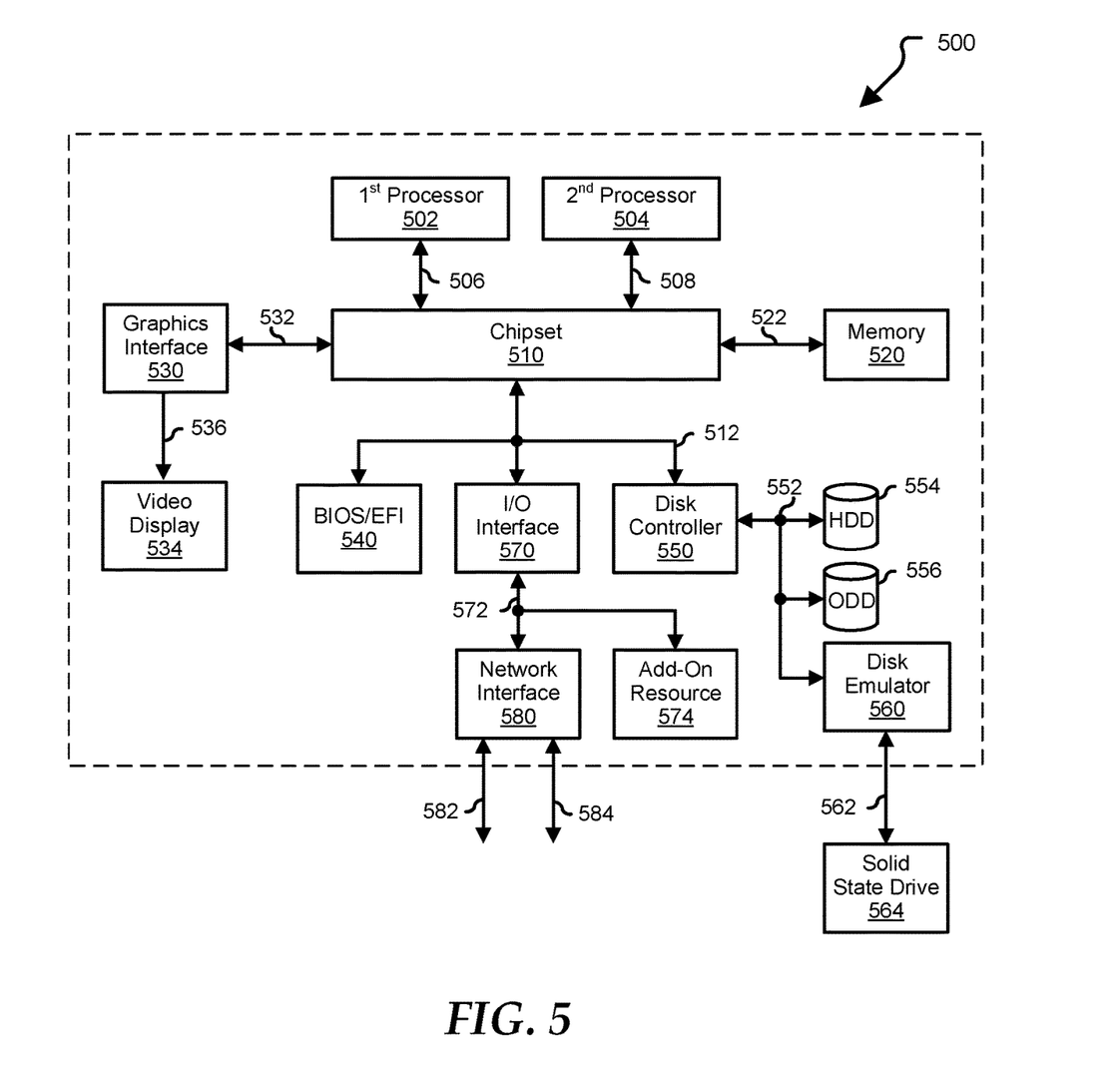
FIG. 5 is a block diagram of a general information handling system, according to an embodiment of the present disclosure.

FIG. 5 illustrates a generalized embodiment of an information handling system 500, such as resources 100a-100n. For purpose of this disclosure, an information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smartphone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input/output (I/O) devices, such as a keyboard, a mouse, and a video display. Information handling system 500 can also include one or more buses operable to transmit information between the various hardware components.

The information handling system 500 includes processors 502 and 504, a chipset 510, a memory 520, a graphics interface 530, include a basic input and output system/extensible firmware interface (BIOS/EFI) module 540, a disk controller 550, a disk emulator 560, an I/O interface 570, and a network interface 580. Processor 502 is connected to chipset 510 via processor interface 506, and processor 504 is connected to chipset 510 via processor interface 508. Memory 520 is connected to chipset 510 via a memory bus 522. Graphics interface 530 is connected to chipset 510 via a graphics interface 532 and provides a video display output 536 to a video display 534. In a particular embodiment, information handling system 500 includes separate memories that are dedicated to each of processors 502 and 504 via separate memory interfaces. An example of memory 520 includes random access memory (RAM) such as static RAM (SRAM), dynamic RAM (DRAM), non-volatile RAM (NV-RAM), or the like, read-only memory (ROM), another type of memory, or a combination thereof.

BIOS/EFI module 540, disk controller 550, and I/O interface 570 are connected to chipset 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 510 can also include one or more other I/O interfaces, including an Industry Standard Architecture (ISA) interface, a SCSI interface, an Inter-Integrated Circuit ($I^2C$) interface, a System Packet Interface (SPI), a Universal Serial Bus (USB), another interface, or a combination thereof. BIOS/EFI module 540 includes BIOS/EFI code operable to detect resources within information handling system 500, to provide drivers for the resources, initialize the resources, and access the resources. BIOS/EFI module 540 includes code that operates to detect resources within information handling system 500, to provide drivers for the resources, to initialize the resources, and to access the resources.

Disk controller 550 includes a disk interface 552 that connects the disc controller to a hard disk drive (HDD) 554, to an optical disk drive (ODD) 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, an SCSI interface, a USB interface, a proprietary interface, or a combination thereof. Disk emulator 560 permits a solid-state drive 564 to be connected to information handling system 500 via an external interface 562. An example of external interface 562 includes a universal serial bus (USB) interface, an Institute of Electrical and Electronics Engineers (IEEE) 594 (Firewire) interface, a proprietary interface, or a combination thereof. Alternatively, solid-state drive 564 can be disposed within information handling system 500.

I/O interface 570 includes a peripheral interface 572 that connects the I/O interface to an add-on resource 574 and to network interface 580. Peripheral interface 572 can be the same type of interface as I/O channel 512 or can be a different type of interface. As such, I/O interface 570 extends the capacity of I/O channel 512 when peripheral interface 572 and the I/O channel are of the same type, and the I/O interface translates information from a format suitable to the I/O channel to a format suitable to peripheral interface 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to information handling system 500, or a combination thereof.

Network interface 580 represents a NIC disposed within the information handling system 500, on a main circuit board of information handling system 500, integrated onto another component such as chipset 510, in another suitable location, or a combination thereof. Network interface 580 includes network channels 582 and 584 that provide interfaces to devices that are external to information handling system 500. In a particular embodiment, network channels 582 and 584 are of a different type than peripheral interface 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

In accordance with various embodiments of the present disclosure, the methods described herein may be implemented by software programs executable by an information handling system such as information handling system 500. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. In a particular non-limiting, exemplary embodiment, the computer-readable medium can include a solid-state memory such as a memory card or other package that houses one or more non-volatile read-only memories.

Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method to improve log management, the method comprising:
   receiving, by a hardware processor, a plurality of incoming logs;
   storing the incoming logs in a log buffer for a pre-determined time; and
   monitoring the incoming logs to detect a triggering event, wherein the monitoring the incoming logs includes:
      parsing the incoming logs prior to the storing the incoming logs in the log buffer to detect the triggering event, wherein the triggering event is one of an error event, a fatal event, or a critical event;
      while not detecting the triggering event, discarding logs in the log buffer when the pre-determined time is reached;
      in response to detecting the triggering event:
         determining whether to discard the logs in the log buffer or to store the logs in the log buffer to a non-volatile storage device, wherein the logs in the log buffer were received prior to the detecting the triggering event;
         in response to determining to discard the logs in the log buffer, discarding the logs in the log buffer; and
         in response to determining to store the logs in the log buffer, storing the logs in the non-volatile storage device wherein the logs are filtered based on a logging level prior to the storing the logs in the non-volatile storage device.

2. The method of claim 1, wherein discarding the logs includes overwriting the logs in the log buffer.

3. The method of claim 1, further comprising discarding the logs in the log buffer subsequent to storing the logs in the non-volatile storage device.

4. The method of claim 1, wherein the triggering event includes detecting a predetermined number of warning events.

5. The method of claim 4, wherein the triggering event includes identifying a pre-determined regular expression in the logs.

6. The method of claim 1, further comprising applying a rule to the logs prior to storing the logs in the non-volatile storage device.

7. The method of claim 6, wherein the rule includes determining whether to modify the logging level of the logs prior to the storing the logs in the non-volatile storage device.

8. The method of claim 1, further comprising resetting a timer that keeps track of the pre-determined time subsequent to reaching the pre-determined time.

9. The method of claim 1, further comprising resetting the logging level of the logs to be stored in the non-volatile storage device to a pre-determined level.

10. The method of claim 1, further comprising generating statistical information subsequent to the storing the logs in the non-volatile storage device.

11. The method of claim 10, determining application usage per time period based on a number of times the logs are stored in the non-volatile storage device.

12. An information handling system configured to manage a plurality of logs, the information handling system comprising:
   a memory device; and
   a processor configured to:
      receive a plurality of incoming logs;
      store the incoming logs in a log buffer for a pre-determined time; and
      monitor the incoming logs to detect a triggering event, wherein the monitor the incoming logs includes:
         parse the incoming logs to detect the triggering event, wherein the triggering event is one of an error event, a fatal event, or a critical event;
         if the triggering event is detected:
            determine whether to discard the logs in the log buffer or to store the logs in the log buffer in a non-volatile storage device, wherein the logs in the log buffer were received prior to detecting the triggering event;
            discard the logs in the log buffer in response to a determination to discard the logs; and
            store the logs in the log buffer in response to a determination to store the logs in the non-volatile storage device; and
         if the triggering event is not detected, then discard the logs in the log buffer when the pre-determined time is reached.

13. The information handling system of claim 12, wherein the processor is further configured to overwrite the logs in the log buffer.

14. The information handling system of claim 12, the processor further configured to apply a rule to the logs in the log buffer prior to storage of the logs in the non-volatile storage device.

15. The information handling system of claim 14, wherein the rule is applied to determine whether to modify a logging level of the logs in the log buffer to be stored in the non-volatile storage device.

16. One or more non-transitory machine-readable media comprising program code for log management, the program code to:
   receive a plurality of incoming logs;
   store the incoming logs in a log buffer for a pre-determined time;
   monitor the incoming logs to detect a triggering event prior to storage of the incoming logs in the log buffer, wherein to monitor the incoming logs includes:
      parse the incoming logs to detect the triggering event, wherein the triggering event is one of an error event, a fatal event, or a critical event;
      in response to detecting the triggering event:
         determine whether to discard logs in the log buffer or to store the logs in the log buffer to a non-volatile storage device, wherein the logs in the log buffer were received prior to detection of the triggering event
         in response to a determination to discard the logs in the log buffer, discard the logs; and
         in response to a determination to store the logs in the log buffer, store the logs in the non-volatile storage device, wherein the logs are filtered based on a logging level prior to storage; and
      in response to not detecting the triggering event, discard the logs in the log buffer when the pre-determined time is reached.

17. The one or more non-transitory machine-readable media of claim 16, further comprising program code to apply a rule to the logs, in response to the determination to store the logs in the non-volatile storage device.

\* \* \* \* \*